United States Patent
Meiden et al.

(10) Patent No.: US 6,546,096 B1
(45) Date of Patent: Apr. 8, 2003

(54) PROXIMITY DETECTOR FOR INITIATING AUTOMATIC CALLBACK

(75) Inventors: David Alan Vander Meiden, Boca Raton, FL (US); Dennis L. Kucmerowski, Delray Beach, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/383,118

(22) Filed: Aug. 25, 1999

(51) Int. Cl.[7] ............................................. H04M 3/42
(52) U.S. Cl. ...................... 379/209.01; 379/201.06; 379/201.07; 379/207.02; 379/207.06; 379/913
(58) Field of Search ...................... 379/201.06, 201.1, 379/207.02, 207.04, 207.05, 207.06, 209.01, 913

(56) References Cited

U.S. PATENT DOCUMENTS

| | | | | |
|---|---|---|---|---|
| 3,824,597 A | * | 7/1974 | Berg ........................... 370/215 |
| 4,298,775 A | * | 11/1981 | Buck et al. ................... 379/284 |
| 4,932,050 A | * | 6/1990 | Davidson et al. ....... 379/211.02 |
| 5,153,908 A | * | 10/1992 | Kakizawa et al. ........... 379/157 |
| 5,425,091 A | | 6/1995 | Josephs ....................... 379/201 |
| 5,739,746 A | | 4/1998 | Shaffer et al. .............. 340/424 |
| 5,784,438 A | | 7/1998 | Martinez ...................... 379/89 |
| 5,825,871 A | * | 10/1998 | Mark ..................... 379/357.03 |
| 5,907,600 A | * | 5/1999 | Fuller et al. ........... 379/106.01 |

* cited by examiner

*Primary Examiner*—Ahmad F. Matar
*Assistant Examiner*—Bing Bui

(57) ABSTRACT

A proximity detector (111) is provided for causing automatic callback. The proximity detector (111) causes the called party's telephone (506) to send a signal to the telephone system indicating that the automatic callback may proceed. For example, the detector may cause an off-hook/on-hook event to be sent, or other specific signaling. The telephone system signals the calling party (502), who may then answer the automatic callback and be connected to the called party.

12 Claims, 6 Drawing Sheets

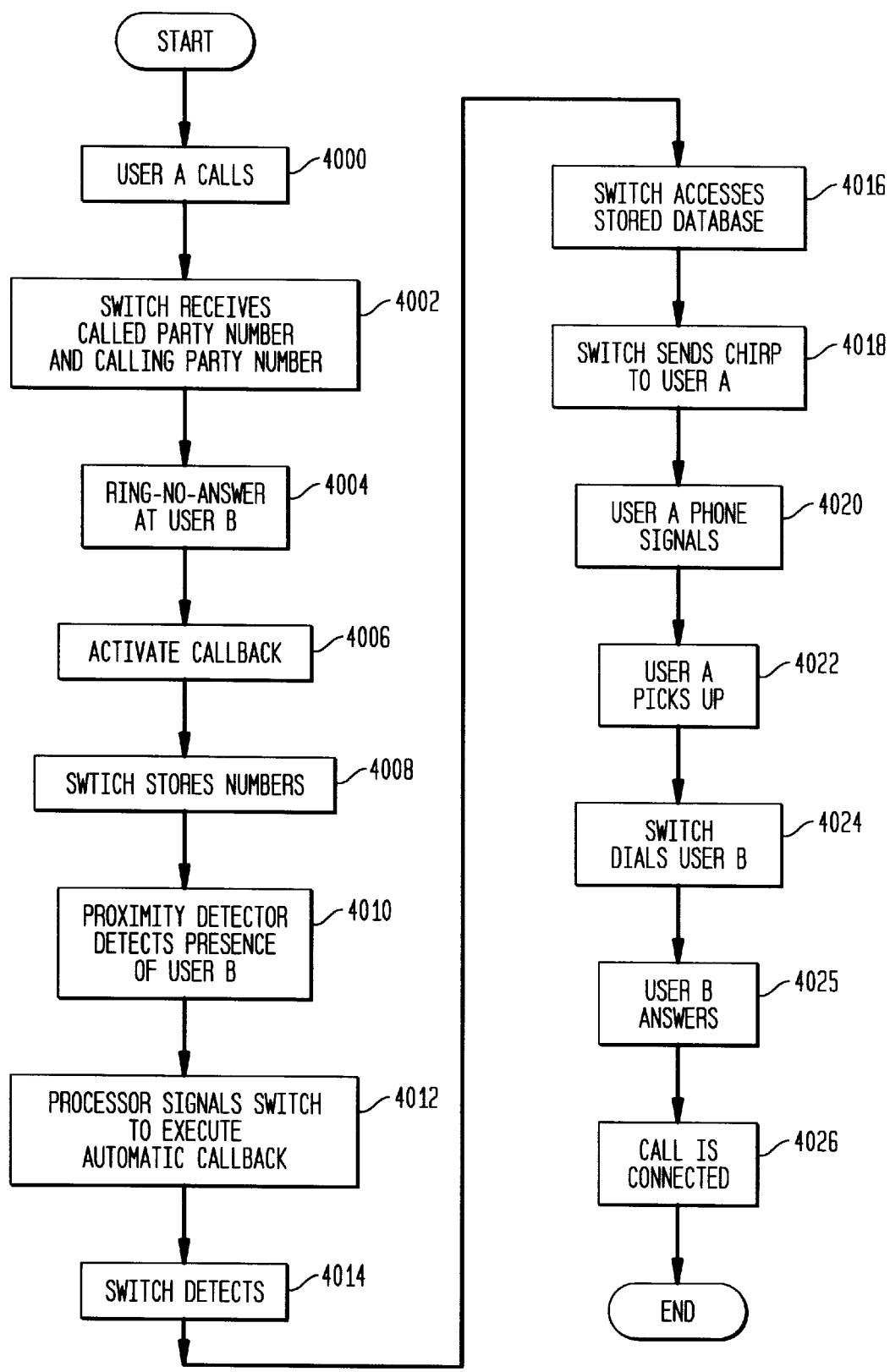

PROXIMITY DETECTOR FOR INITIATING AUTOMATIC CALLBACK

BACKGROUND OF THE INVENTION

1. Field of the Invention

The present invention relates to telecommunications systems, and in particular, to an improved callback system.

2. Description of the Related Art

Automatic Callback is a supplemental service provided in some telephone systems. In such systems, a calling party may initiate the Automatic Callback feature if a called party does not answer. The calling party does so, for example, by entering a sequence of DTMF (dual tone multifrequency) digits on a keypad, or by pressing one or more function keys. The next time the called party takes the telephone off hook and then back on hook, such as by completing a telephone call, the calling party is signaled by the called party's telephone, such as by a special ringing or chirping. When the calling party answers by taking his telephone off hook, the calling party's telephone automatically dials the called party's number.

As can be appreciated, such systems have a disadvantageous delay inherently built in. In particular, such systems are dependent upon the called party placing a telephone call before the Automatic Callback is initiated. The calling party has no assurance that the call will be returned promptly, thereby defeating the entire purpose of Automatic Callback.

SUMMARY OF THE INVENTION

These and other problems in the prior art are overcome in large part by a system and method according to the present invention. In particular, a proximity detector is provided, wherein a called party's presence is detected. The proximity detector causes the called party's telephone to send a signal to the telephone system indicating that the automatic callback may proceed. For example, the detector may cause an off-hook/on-hook event to be sent, or other specific signaling. The telephone system signals the calling party, who may then answer the automatic callback and be connected.

A telephone according to one embodiment of the invention includes a motion detector for detecting whether a called party is present within a predetermined distance of a telephone. If so, the proximity detector causes the telephone to go off hook and then on hook, or issues other command or control signals, to indicate that Automatic Callback should proceed.

A telephone according to another embodiment of the invention includes a photodetector which produces an output signal proportional to a level of ambient light. If the level of ambient light is high, indicating that office lights are on, the photodetector triggers a signal, which causes automatic callback to proceed.

A telephone according to another embodiment of the invention includes a receiver configured to receive an electromagnetic or other signal from a transmitter associated with a light switch. When the light switch activates, thereby triggering the lights, a signal is transmitted to the telephone. The receiver receives the signal and causes a command to be issued, to initiate automatic callback.

BRIEF DESCRIPTION OF THE DRAWINGS

A better understanding of the invention is obtained when the following detailed description is considered in conjunction with the following drawings in which:

FIG. 9 is a flowchart illustrating operation of an automatic callback system according to an embodiment of the invention.

DETAILED DESCRIPTION OF THE INVENTION

Figure 1:
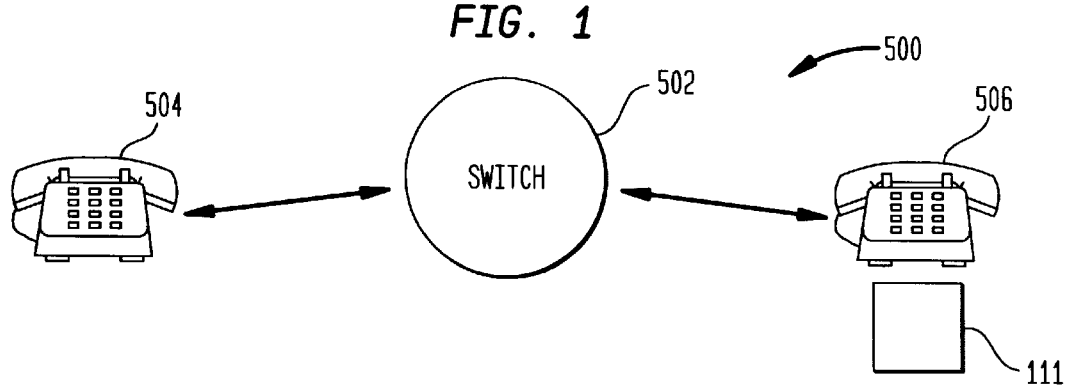
FIG. 1 is a diagram of an exemplary telecommunications system according to an embodiment of the invention.

Turning now to the drawings and, with particular attention to FIG. 1, a diagram illustrating an exemplary telecommunications system 500 employing automatic callback according to an embodiment of the invention is shown. In particular, the telecommunications system 500 includes a switch 502 coupled to switch calls between a calling party telephone 504 and a called party telephone 506. The switch 502 is any known switch, such as a Central Office (CO) switch or a Private Branch Exchange (PBX). The switch 502 may include a control processor (not shown) and a memory (not shown) for storing called party and calling party numbers. The switch 502 may be configured to implement automatic callback, for example, in a manner similar to that described in U.S. Pat. No. 5,784,438, which is hereby incorporated by reference in its entirety as if fully set forth herein.

The calling party telephone 504 and the called party telephone 506 are configured to implement automatic callback according to the present invention. Thus, as will be explained in greater detail below, the called party telephone 506 may be equipped with a proximity detector 111 according to the present invention. The proximity detector 111 is used to provide a signal to the switch 502 to initiate callback when a called party's presence is detected.

Figure 2:
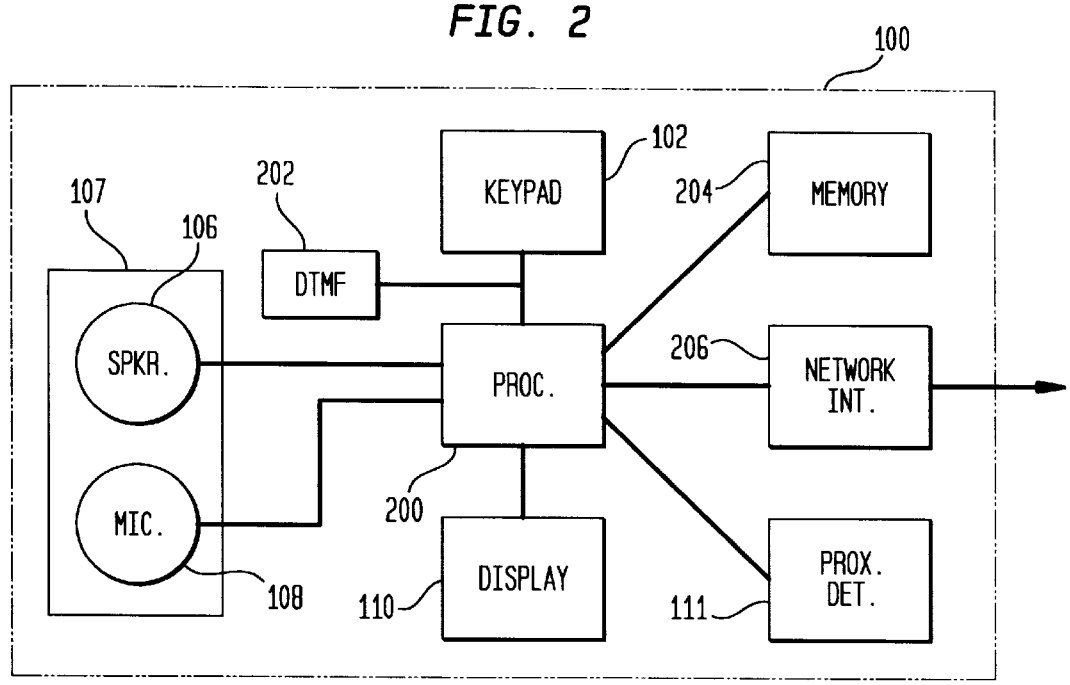
FIG. 2 is a block diagram of an exemplary telecommunications device according to an embodiment of the invention.

Turning now to FIG. 2, a block diagram of a telephone according to an embodiment of the invention is shown. The telephone 100 includes a handset 107 including a speaker 106 and a microphone 108. Also included are a keypad 102, which may be included in the handset 107, an associated dual tone multifrequency (DTMF) coder/decoder 202, and a display 110. The display 110 may be embodied as a liquid crystal display (LCD). A network interface 206 exchanges signals with the switch according to known signaling protocols.

The operation of the telephone 100 may be controlled by the processor 200. The processor 200 may be a known microprocessor or microcontroller which executes programs that are stored in a storage device, such as a memory 204, or by discrete logic components or one or more integrated semiconductor chips. Under control of the processor 200, the network interface 206 transmits control signals over the telephone network to the switch. Certain of these control signals identify whether the telephone is on hook or off hook, or provide other indicia of whether automatic callback should be activated.

The telephone 100 further includes a proximity detector 111 in accordance with one embodiment of the present invention. More particularly, once a calling party has received a ring-no-answer from the called party's telephone, and has activated automatic callback, the called party's telephone monitors the proximity detector 111. The proximity detector 111 may be embodied, for example, as a passive infrared (PIR) detector, a photodetector, or a light-switch associated signaling device, as will be explained in greater detail below. When the proximity detector 111 detects the presence of the called party, it sends a signal to the processor 200, instructing the processor 200 to send a signal to the switch 502 indicating that the automatic callback should proceed. For example, the processor 200 may cause the telephone 100 to send a signal to the switch 502 that indicates an off hook and then an on hook. Alternatively, the processor 200 may issue one or more dedicated control signals to the switch 502 via the network interface 206.

As will be explained in greater detail below, the processor 200 may activate the automatic callback signal either immediately upon detection of user presence, or after a predetermined time after user presence has been detected, or after a predetermined function or event has occurred in addition to the detection of user presence.

Figure 3:
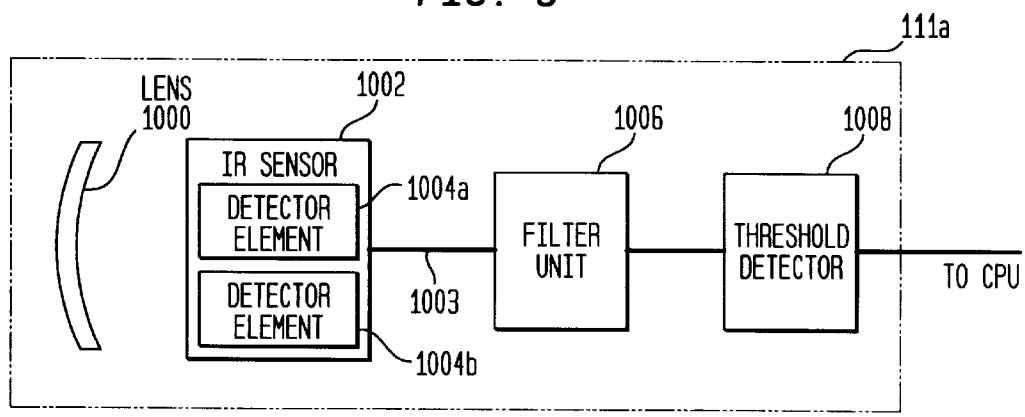
FIG. 3 is a diagram illustrating an exemplary proximity detector according to an embodiment of the invention.

FIG. 3 illustrates an exemplary user detector 111a employing a passive infrared (PIR) sensor to detect the presence of a called party. The user detector 111a may be positioned within the telephone 100 or as a separate unit or module electrically coupled to the telephone 100.

The user detector 111a includes a lens 1000 configured to direct incident infrared radiation or heat from the region being monitored onto an infrared sensor 1002. The lens 1000 may be embodied as any of a variety of optical or non-optical lenses. For example, the lens 1000 may be embodied as a clear planar piece of plastic having no optical properties. Alternatively, the lens 1000 may be embodied as a lens having optical properties and configured to direct incident radiation on a focal point or points as desired. The lens 1000 may still further be embodied as a Fresnel lens or a segmented Fresnel lens array defining a plurality of individual Fresnel lenslets to direct the incident radiation as desired.

The infrared sensor 1002 receives infrared radiation from the region being monitored via the lens 1000 and produces an output voltage on the line 1003 representative of the incident IR radiation. The IR sensor 1002 may be embodied as a dual element integrated circuit detector chip which provides two separate detector elements 1004a and 1004b in one chip with a single output line 1003 for the two detectors. Radiation striking each element generates a representative signal. The detector elements and chip circuitry are configured such that if IR radiation strikes the two detectors simultaneously, the signals from the two detectors cancel, and in an ideal system, no signal appears on the line 1003. This permits the detectors to discriminate against overall background changes in temperature. Thus, a temperature change over the area covered by both detectors produces opposite signals in the opposing detector elements, thereby canceling one another and preventing the device from transmitting a signal on line 1003. However, if radiation strikes detector element 1004a and detector element 1004b sequentially, then no cancellation occurs and two sequential signals are provided at the output line 1003. Thus, the detector elements 1004a and 1004b are able to detect when a target object moves across the user detector 111a's field of view.

The detector output on line 1003 is provided to a signal processing and filter unit 1006 which provides various signal processing functions including amplification and filtering to remove various spurious signal components that likely come from sources unrelated to a person or similar warm target entering the detector's field of view. The signal processing and filter unit 1006 may be embodied as a high pass filter which filters out lower frequency components of the signal typically caused by variable environmental conditions, such as local temperature variations or spurious signals caused by air movement from individual air ducts. In addition, a low pass filter may be provided to eliminate unwanted higher frequency components from spurious infrared radiation impinging on a detector or from induced electrical interference.

The output of the signal processing and filter unit 1006 is provided to a threshold detector or comparator 1008. The threshold detector 1008 receives the output signal and determines whether it is of sufficient magnitude to warrant triggering the automatic callback. The threshold detector 1008 thus serves as another method of avoiding false automatic callbacks. A desired target, such as a called party, will emit a comparatively large amount of infrared radiation and consequently undesired signals may be discriminated against on the basis of magnitude. A filtered signal greater than a threshold magnitude is assumed to be generated by a desired target in the range of the device and in response a signal is provided to the user detector control. Electrical signals less than the threshold value are assumed to be generated by something other than a calling party and no signal is provided.

Figure 4:
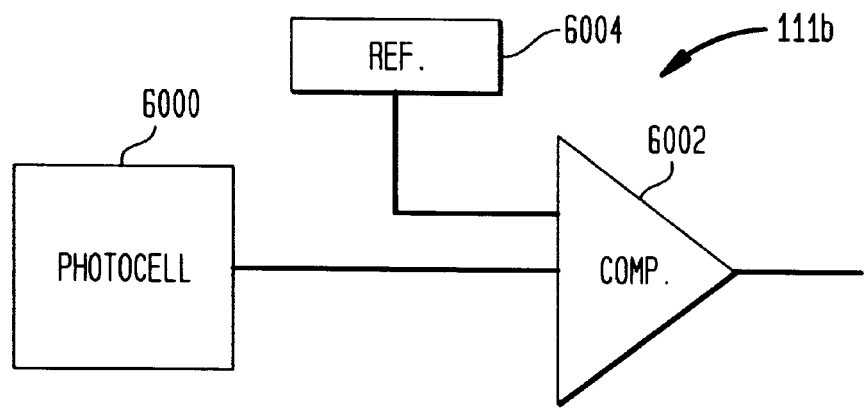
FIG. 4 is a diagram of another exemplary proximity detector in accordance with another embodiment of the invention.

Another exemplary proximity detector 111b is shown with reference to FIG. 4. As shown in FIG. 4, the proximity detector 111b may include a photodetector to detect a level of ambient light indicative, for example, of a predetermined intensity of office lighting. The proximity detector 111b thus includes a photocell 6000 coupled to a detecting circuit 6002. The photocell 6000 outputs a predetermined voltage in response to a predetermined intensity of light being received. For example, the output of the photocell 6000 may be proportional to a level of light. The detecting circuit 6002 receives the output from the photocell 6000 and outputs a control signal if the voltage signal exceeds a predetermined threshold. Thus, the detecting circuit 6002 may be embodied as one or more comparators receiving the output of the photocell 6000 at one input, and a reference voltage 6004 on another. The output of the detecting circuit 6002 is used by the processor 200 to indicate that a user is present. It is noted that this embodiment may have greatest utility in an environment in which the office lights are themselves controlled by motion sensors and time out if no motion is detected for a predetermined period.

Figure 5:
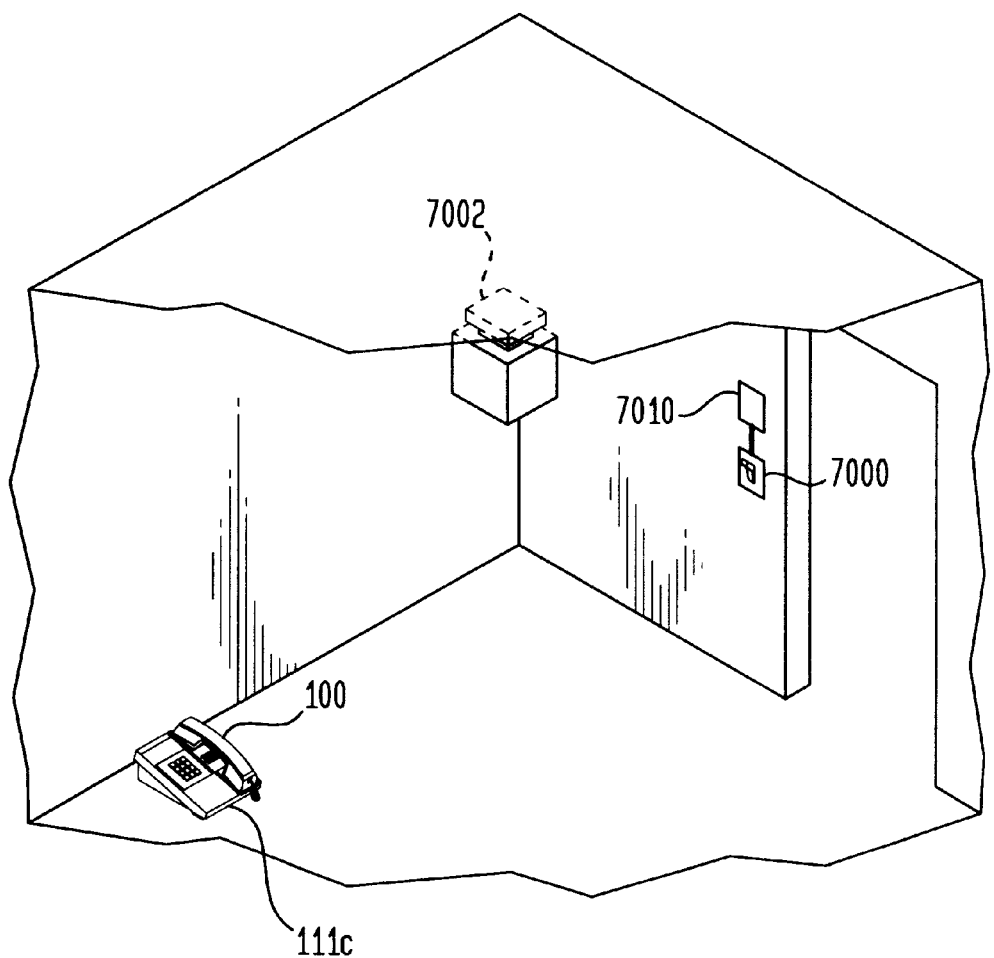
FIGS. 5–7 illustrate another proximity detector system in accordance with another embodiment of the invention.
Figure 6:
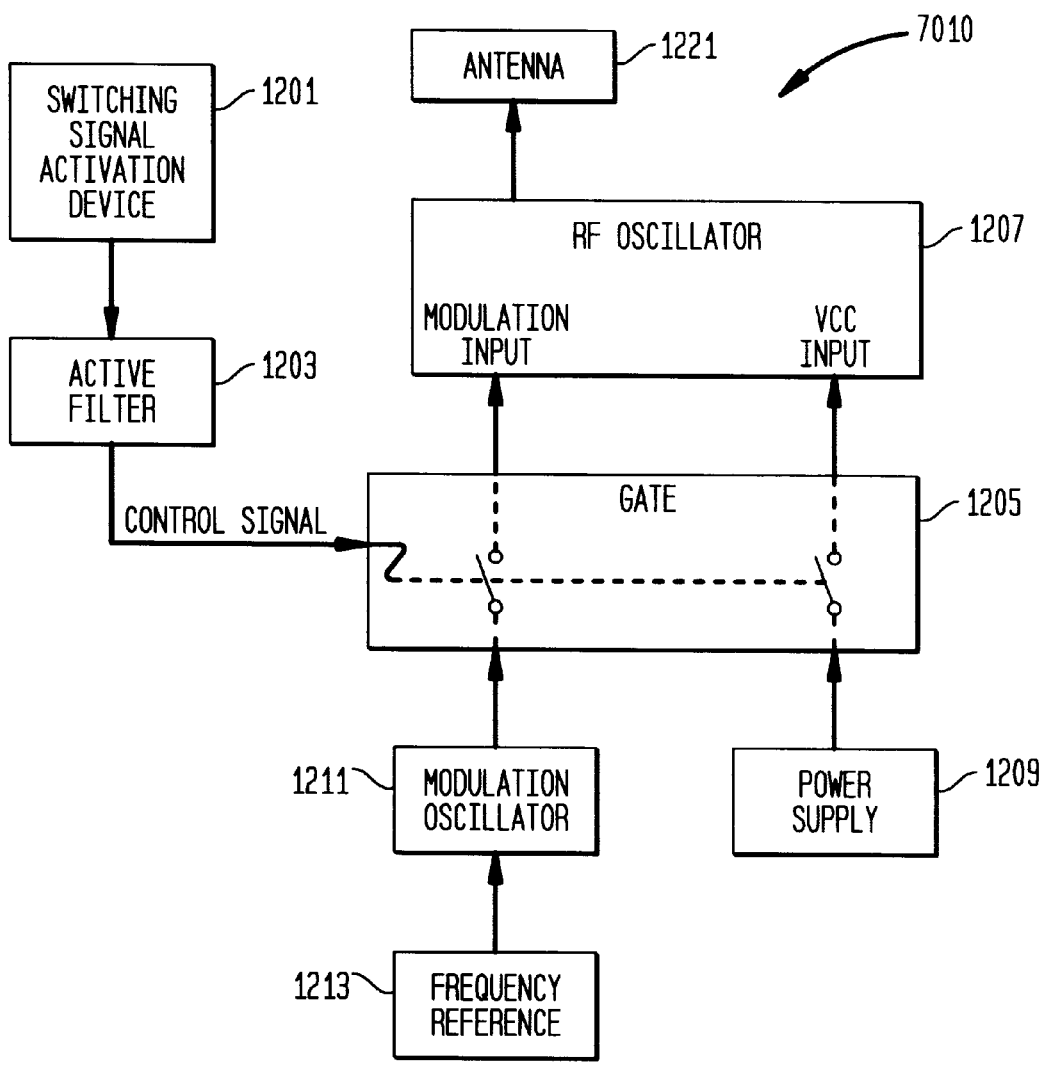
Figure 7:
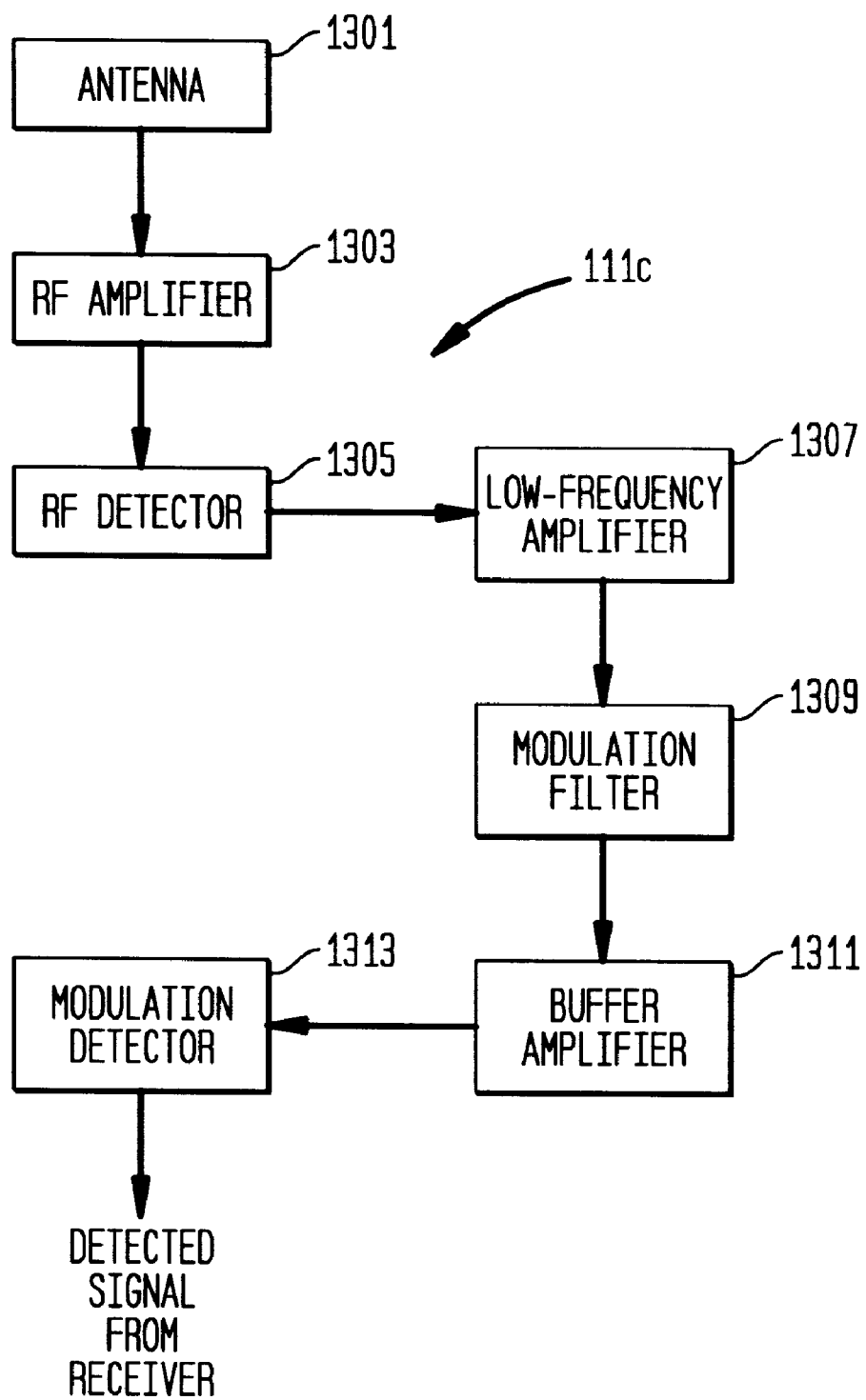

A yet further embodiment of a proximity sensor is shown with reference to FIGS. 5–7. In the embodiment illustrated with reference to FIGS. 5–7, a light switch such as a wall light switch is utilized to transmit a signal, such as an electromagnetic or ultrasonic signal, to the telephone's proximity detector when the lights are on. This signals to the telephone that a user is present. Further, while illustrated as with a manual light switch, the embodiment may also be useful with a motion detector-activated lighting.

For example, turning now to FIG. 5, a representative pictorial view of a typical installation for the proximity detecting automatic callback system of this embodiment is shown. As shown, a light switch 7000 is coupled in series with a power source (not shown) to a load device 7002. The load device 7002 may be a-light fixture hardwired to an existing electrical system. The light switch 7000 may be activated manually or, in certain embodiments, by a motion detector. Upon activation, the light switch 7000 reverses the energization state of the load device 7002. The light switch 7000 further includes a signaling device 7010, which is used to transmit a signal to the proximity detector 111c of the telephone 100. The switching signal may be modulated or an open carrier signal.

FIG. 6 is a block diagram of exemplary electrical circuitry of transmitter switch or signaling device 7010. A switching signal activation device 1201 may be provided. The switching signal activation device 1201 may be embodied as a single-pole, momentary contact switch. An active filter 1203 may be used to modify the response time of the switching signal activation device 1201 to enable a gate 1205 whenever the light switch is activated. The gate 1205 may be activated, for example, for about one second. When the gate 1205 is enabled, power is applied to the RF oscillator 1207 from a power supply 1209. The gate 1205 may also be used to apply modulation to the RF oscillator 1207. The modulation signal may be produced by a modulation oscillator 1211. In one embodiment, the frequency of the modulation oscillator is determined by a frequency reference 1213 which, for example, may be a crystal resonator operating at approximately 30 kHz. The output of the oscillator 1207 is coupled to the antenna 1221. The antenna 1221 may be embodied as a wire jumper or printed circuit trace running in close proximity to the oscillator 1207.

FIG. 7 illustrates an exemplary proximity detector 111c (FIG. 5). An antenna 1301 is used to receive the signal from the transmitter switch or signaling device 7010. The signal from the antenna 1301 is fed into an RF amplifier 1303 to increase the amplitude of the signal received by the antenna 1301. After amplification, the signal is passed to the RF detector 1305 which removes the RF carrier from the received signal. The resulting baseband signal at the output of the RF detector 1305 is fed to a low frequency amplifier 1307 and a modulation filter 1309. The modulation filter 1309 is designed to pass one or more discrete modulation frequencies. In one embodiment, the modulation filter is a crystal filter which is tuned to the particular frequency.

The output of the modulation filter 1309 is fed to a buffer amplifier 1311. The buffer amplifier increases the amplitude of the demodulated signal so that the detected signal is of sufficient strength to drive a modulation detector 1313. The modulation detector converts the discrete frequency components at the output of the buffer amplifier 1311 into a DC voltage offset. The AC component of the waveform is removed by modulation detector 1313. The DC voltage offset is used to drive control circuitry and provide one or more signals to the processor 200.

As will be discussed in greater detail below, the proximity detectors 111a–111c provide an output signal to the processor 200 when a called party is detected. Either immediately thereafter, or after the occurrence of an intermediate event, the processor 200 will issue a signal indicating that the called party is now present.

Figure 8:
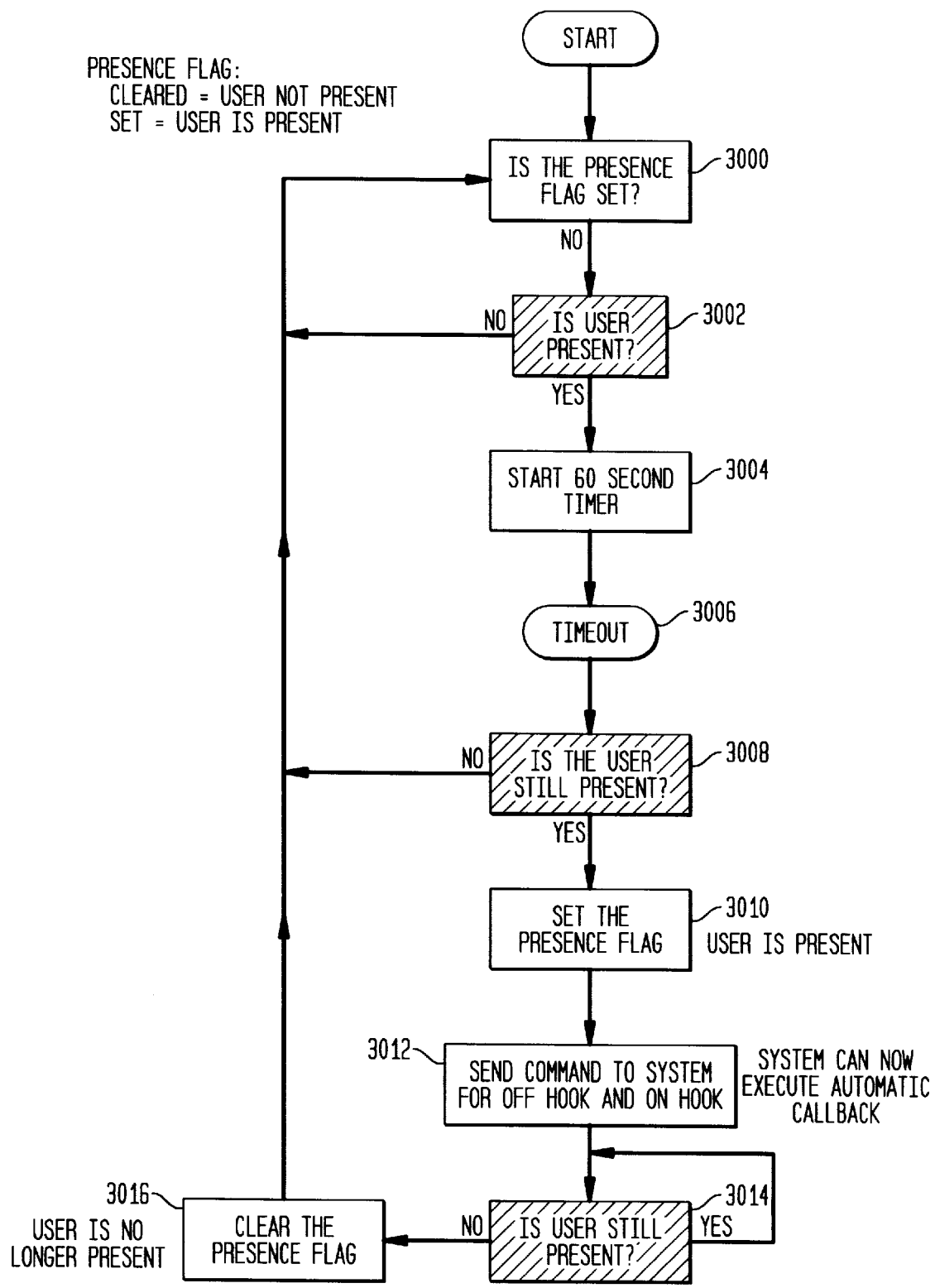
FIG. 8 is a flowchart illustrating automatic callback signaling according to an embodiment of the invention.

For example, turning now to FIG. 8, a flowchart illustrating operation of an embodiment of the invention is shown. In a step 3000, the processor 200 checks the status of a presence flag (not shown) which may be stored in a control register (not shown). For example, the presence flag may be cleared when a user or called party is not present, and may be set when a user or called party is present. In a step 3002, the processor queries the proximity detector 111 or reads the output of the proximity detector to determine whether the user or called party is present. If the user is present, then a timer may be activated, in a step 3004. For example, the timer may be a 60 second timer. In a step 3006, the timer times out. The processor 200 then queries the proximity detector again to determine if the user or called party is still present, in a step 3008. If the user is, in fact, still present, then in a step 3010, the processor 200 sets the presence flag in the status register. In addition, in a step 3012, the processor 200 sends a command to the switch 502 indicating that the automatic callback can proceed. The switch 502 then initiates callback in the manner described below. Next, in a step 3014, the processor 200 continues to query as to whether the user is still present. If the proximity detector no longer detects the user's presence, the processor 200 is notified and the presence flag is cleared, in a step 3016.

A flowchart illustrating automatic callback operation according to an embodiment of the present invention is shown in FIG. 9. In particular, in a step 4000, a User A (calling party) 504 (FIG. 1) makes a call to User B (called party) 506 (FIG. 1). In a step 4002, the switch 502 receives the called party's telephone number, for example, as DTMF tones. In a step 4004, the User B's telephone rings, but no answer is received. In a step 4006, the User A may activate automatic callback, for example, by entering a predetermined code sequence into the keypad. The resulting DTMF tones are received at the switch 502. In a step 4008, in response to the received DTMF signals indicating that automatic callback is being activated, the switch 502 stores the called number and the calling party number in a memory (not shown). Then, in a step 4010, the proximity detector 111 detects the presence of a user and sends a signal to the processor 200. The processor 200 then issues commands to the switch indicating automatic callback can proceed, in a step 4012. In a step 4014, the switch 502 detects that automatic callback can now be executed. Then, in a step 4016, the switch 502 accesses its database of associated called and calling party numbers. In a step 4018, the switch 502 sends a chirp or other signal tone or indicia to the calling party's telephone. In a step 4020, the calling party's telephone emits the appropriate signal. In a step 4022, the User A picks up, or takes the telephone off hook. In response, the switch "dials" the number of the called party, in a step 4024. In a step 4025, the User B answers the phone. Finally, in a step 4026, the switch 502 connects the User A to User B.

What is claimed is:

1. A telecommunications device, comprising:

a controller for establishing communication with another telecommunications device via a network; and a proximity detector for providing one or more control signals corresponding to automatic callback control signals onto said network indicative of whether a user is present;

said proximity detector responsive to light in a room associated with said another telecommunications device.

2. A telecommunications device in accordance with claim 1, said proximity detector comprising one or more photodetectors.

3. A telecommunications device in accordance with claim 1, said proximity detector comprising a receiver for receiving a signal from a light switch indicative of whether said light switch has been actuated.

4. A telecommunications device in accordance with claim 1, said one or more signals including an off hook and on hook indication.

5. A telecommunications system, comprising:

a first telephony device coupled to a network and configured to activate an automatic callback feature with a second telephony device; wherein said second telephony device includes a proximity detector for controlling transmission of one or more signals onto said network indicative of a user's presence to cause automatic callback with said first telephony device;

said proximity detector responsive to light in a room associated with said second telephony device.

6. A telecommunications system in accordance with claim 5, said proximity detector comprising one or more photodetectors.

7. A telecommunications system in accordance with claim 5, said proximity detector a receiver for receiving a signal from a light switch indicative of whether said light switch has been actuated.

8. A telecommunications system in accordance with claim 5, said one or more signals including an off hook and on hook indication.

9. A method for operating a telecommunications system, comprising:

activating an automatic callback feature at a first telephony device after a ring-no-answer condition with a second telephony device;

providing a signal from a proximity detector associated with said second telephony device indicative of a user presence at a location of said second telephony device; and establishing automatic callback in response to said signal;

said proximity detector responsive to light in a room associated with said second telephony device.

10. A method according to claim 9, said providing including providing a signal from one or more photodetectors.

11. A method according to claim 9, said providing including providing a signal indicative of whether a light switch has been actuated.

12. A method according to claim 9, said providing including providing one or more signals including an off hook and on hook indication.

\* \* \* \* \*